Aug. 8, 1933.   O. M. LERCH   1,921,530
FLEXIBLE NONBREAKABLE PIPE STEM JOINT
Filed April 16, 1932
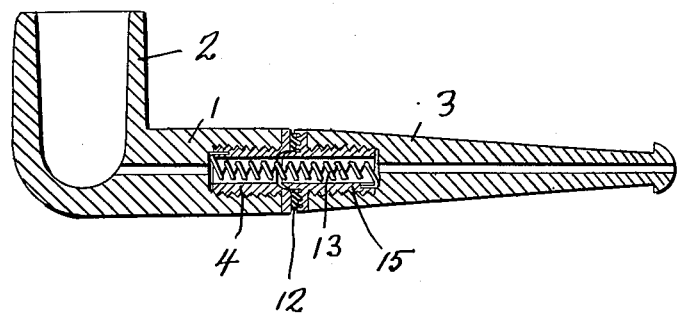
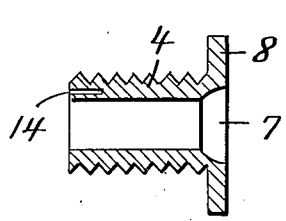
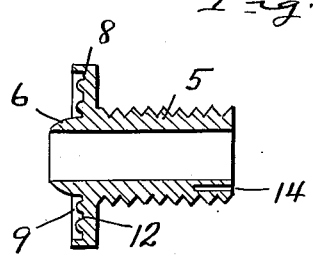
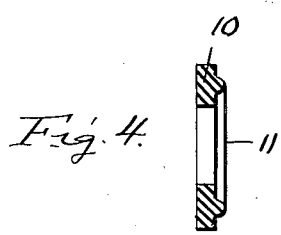
Inventor
Oliver M. Lerch
By Clarence A. O'Brien
Attorney Patented Aug. 8, 1933

1,921,530

UNITED STATES PATENT OFFICE 1,921,530

FLEXIBLE NONBREAKABLE PIPE STEM JOINT

Oliver M. Lerch, Rimersburg, Pa.

Application April 16, 1932. Serial No. 605,692

1 Claim. (Cl. 131—12)

This invention relates to a flexible non-breakable joint for connecting the stem to the bowl part of a pipe, the general object of the invention being to provide a pair of bushings, one of which fits in the stem of the bowl part of the pipe and the other in the mouth piece of the stem, and spring means for connecting the bushings together, so as to provide a joint that is flexible and non-breakable, with a gasket between the two bushings for preventing leakage.

This invention also consists in certain other features of construction and in the combination and arrangement of the several parts to be hereinafter fully described, illustrated in the accompanying drawing and specifically pointed out in the appended claim.

In described the invention in detail, reference will be had to the accompanying drawing wherein like characters denote like or corresponding parts throughout the several views, and in which:—

Figure 1 is a sectional view through a pipe constructed in accordance with this invention.

Fig. 2 is a view of the female bushing.

Fig. 3 is a view of the male bushing.

Fig. 4 is a view of the gasket.

In the drawing, the numeral 1 indicates the stem of the bowl 2 while the numeral 3 indicates the mouth piece stem. The adjacent ends of the stems have sockets therein which are screw threaded as shown with the socket in the stem 1 adapted to receive the bushing 4 and the socket in the stem 3 adapted to receive the bushing 5, these bushings being exteriorly threaded so that they can be threaded in the sockets. However if desired, these bushings can frictionally fit in the sockets.

The bushing 5 is provided with a rounded outer end 6 for fitting in a substantially semi-spherical recess 7 in the outer end of the bushing 4 to provide what might be termed a universal joint. Each bushing is flanged as shown at 8, these flanges fitting over the adjacent ends of the stems 1 and 3, and one flange 8 is formed with a recess 9 in its outer face to receive portions of a gasket 10 which is provided with an annular rib 11 for fitting in a groove 12 formed in the bottom of the recess 9. Thus this gasket forms a tight joint between the bushings so as to prevent leakage of air or smoke.

A spring 13 has its ends fitting in holes 14 formed in the inner ends of the bushings so that the spring will act to draw the bushings together and thus hold the stems 1 and 3 together.

Thus it will be seen that I have provided a flexible joint between the mouth piece stem and the bowl stem of a pipe which eliminates the breakage of the joint. The bushings can easily be removed for cleaning purposes or for repair purposes.

It is thought from the foregoing description that the advantages and novel features of the invention will be readily apparent.

It is to be understood that changes may be made in the construction and in the combination and arrangement of the several parts provided that such changes fall within the scope of the appended claim.

Having thus described my invention what I claim as new is:—

A smoking pipe comprising a bowl having a stem part, a mouth piece having a stem part, the adjacent ends of said stem parts having recesses therein, a bushing fitting in each recess with the outer end of each bushing having a flange thereon extending over the end of the stem part which carries the bushing, the outer end of one bushing having a substantially semi-spherical recess therein, and the outer end of the other bushing having a rounded projection thereon for fitting in the recess, the flange of one bushing having a recess in its outer face, a gasket fitting in the recess and contacting the flange of the other bushing, and a spring passing through the two bushings and having its ends connected to the inner ends of the bushings.

OLIVER M. LERCH.